United States Patent

[11] 3,629,933

[72] Inventor Emil Sirmay
2419 Hamilton Ave., Trenton, N.J. 08619
[21] Appl. No. 813,254
[22] Filed Apr. 3, 1969
[45] Patented Dec. 28, 1971

[54] METHOD FOR ATTACHING METALLIC MEMBERS
2 Claims, 8 Drawing Figs.

[52] U.S. Cl. .................................................. 29/483,
29/401, 29/470.5, 29/503, 29/DIG. 4, 29/527.5
[51] Int. Cl. ........................................................ B23k 1/20,
B23k 31/02, B23k 35/12
[50] Field of Search............................................ 29/482,
483, 503, 527.5, 183, 470.5, 401, DIG. 4

[56] References Cited
UNITED STATES PATENTS

| | | | |
|---|---|---|---|
| 1,605,443 | 11/1926 | Kennedy ........................ | 29/191.4 X |
| 2,775,030 | 12/1956 | Weiss ............................. | 29/530 |
| 3,310,388 | 3/1967 | Bennett et al................. | 29/501 X |
| 3,517,434 | 6/1970 | Shaver........................... | 29/503 X |

*Primary Examiner*—John F. Campbell
*Assistant Examiner*—D. C. Reiley
*Attorney*—Ostrolenk, Faber, Gerb & Soffen ABSTRACT: Two or more bodies of metallic material have adjacent reentrant openings, the surfaces of which are roughened, and a molten metallic is poured into the cavity formed by the adjacent openings to secure the members together. The cast insert may be of any material and the bodies formed may be of any materials similar or dissimilar to one another and the cast locking insert.

PATENTED DEC28 1971 3,629,933

INVENTOR.
EMIL SIRMAY
BY
OSTROLENK, FABER, GERB & SOFFEN
ATTORNEYS

METHOD FOR ATTACHING METALLIC MEMBERS

This invention relates to a novel process for joining two bodies, and more specifically relates to a novel process for joining two bodies by forming reentrant openings in adjacent surfaces of the bodies and casting a wedge-shaped locking form into the cavity formed by the two bodies.

In order to join bodies together which may be metallic, it is common to use welding techniques. When welding, it is necessary to clean the surfaces carefully, to provide suitable fluxes and to have sufficient clearances for welding equipment to gain access to the joint. Obviously, skilled personnel are required. Moreover, the relatively high welding temperatures can cause distortion of the parts being joined. These problems are specially difficult when repairing equipment in crowded quarters and the parts are massive and difficult to move. Moreover, a satisfactory weld is often difficult or impossible to obtain when securing together parts of different materials including, but not limited to, a weld of aluminum to cast iron.

In accordance with the invention, two parts to be joined are prepared by forming reentrant openings or slots which are aligned with one another to form a cavity. This can be done by simple machining into the surface of the parts. Preferably, the opening surfaces are roughened. An insert of any desired material is then cast into the cavity, and, when it solidifies, forms a permanent lock between the parts.

During the casting operation, the mass of the insert is usually quite small relative to the mass of the parts being joined so that the temperature rise of the parts will be small compared to their local temperature rise during welding. It will be apparent that this technique could be performed by unskilled labor and that parts of diverse materials can be joined since they are mechanically locked together rather than alloyed together as in welding. Thus, the strength of the bond can be compatible with the strength of the parts. Moreover, the process can be carried out in crowded quarters, since, after forming the openings or slots by simple hand tools if necessary, it is only necessary to have sufficient space to pour the molten material into the cavity between the parts.

Accordingly, a primary object of this invention is to join parts in a simple and effective manner.

Another object of this invention is to provide a novel process for joining parts formed of different metals.

A further object of this invention is to permanently join metal parts without using temperatures required in welding.

These and other objects of the instant invention will become more readily apparent after reading a description of the accompanying drawings, in which.

Figure 1:
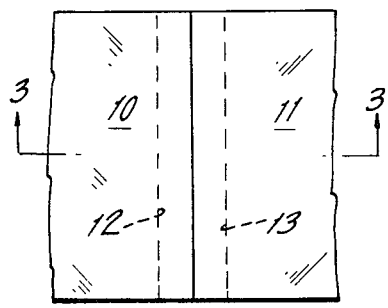
FIG. 1 is a front plan view of the two metal parts which are to be joined.
Figure 2:
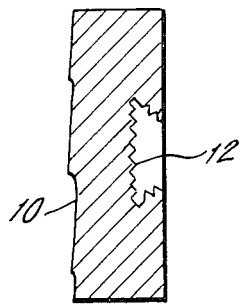
FIG. 2 is a cross section view of one of the parts of FIG. 1 and shows the roughened reentrant opening surface in exaggerated fashion.

Referring first to FIGS. 1 and 2, there is illustrated two bodies 10 and 11 which are to be butt joined. Bodies 10 and 11 may be of similar or dissimilar materials such as brass, cast iron, steel, aluminum, copper, or any of the ferrous or nonferrous materials. The opposing surfaces of bodies 10 and 11 have reentrant and, specifically, dovetail slots 12 and 13 formed therein by any desired machining operation using hand-held or automatic tools. By way of example, slots 12 and 13 may have depths of ½ inch and widths of 1½ inch at the bases and widths of 1 inch at their tops.

As shown in FIG. 2, the surface of the openings, such as opening 12 may be roughened, as by filing or sand blasting or the like, preferably to a finishing number in the range 125–1,000.

Figure 3:
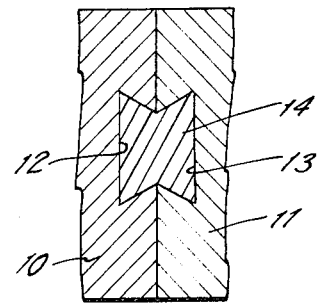
FIG. 3 shows a cross section view of FIG. 1 taken across section line 3—3 in FIG. 1.

FIG. 3 shows the bodies 10 and 11 with their slots 12 and 13 aligned and filled with insert 14. Insert 14 will clearly lock bodies 10 and 11 together and may be formed of any desired material which can be case and which has a melting point above 1,000° F. such as bronze, aluminum, steel or the like. Note that the insert 14 and the bodies 10 and 11 may be of different materials.

In casting the insert, the material is simply heated until molten, and then poured into one end of the cavity formed by slots 12 and 13. A suitable block can be placed against the opposite end of the cavity to prevent it from running out the other end. Upon solidification of the insert 14, a good bond will be established between bodies 10 and 11.

Figure 4:
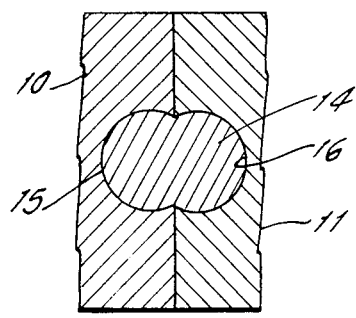
FIGS. 4 and 5 are similar to FIG. 3 and show different configurations for the reentrant openings.

FIG. 4 shows a circular slot configuration for slots 15 and 16 which permits their formation by drilling holes which reach the surface of the respective bodies 10 and 11. This will form suitable reentrant slots to securely hold the cast insert 14. Note that the interior surfaces can be roughened as in FIG. 2.

Figure 5:
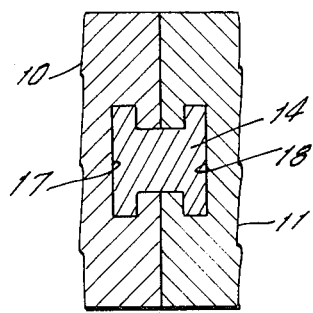

FIG. 5 shows a further modification in which reentrant slots 17 and 18 are T-shaped.

Figure 7:
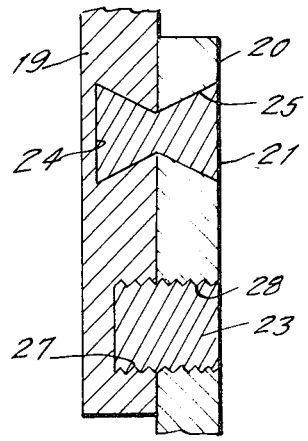
FIG. 7 shows a cross section of FIG. 6 taken across section line 7—7 in FIG. 6.
Figure 6:
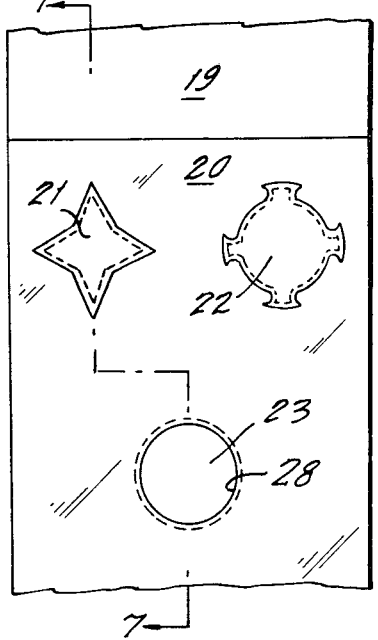
FIG. 6 shows a front view of two members to be joined and illustrates various configurations which, individually or combined would resist shear and torsion forces.

FIGS. 6 and 7 show an arrangement for securing two bodies 19 and 20 to one another against shear or torsion. Three cast inserts 21, 22 and 23 are shown which take different forms. The three joints could each have the form of either of inserts 21, 22 or 23, or, if desired, only a single insert of the shape of inserts 21, 22 and 23 could be used.

Referring first to insert 21, it is seen that a reentrant hole 24 is formed in body 19, and a wedge-shaped opening 25 passes through body 20 and is aligned with opening 24. Both hole 24 and opening 25 have the four-pointed configuration shown in FIG. 6. Thus, when insert 21 is cast, by pouring metal through opening 25 into hole 24, a locking action is obtained between the reentrant shapes of hole 24 and opening 25. The noncircular shape of insert 21 will prevent against rotation of bodies 19 and 20 relative to one another if insert 21 is the only interconnecting member between bodies 19 and 20.

Insert 22 of FIG. 6 shows an alternate, noncircular insert form similar to form 21 where the insert has a gear shape.

Insert 23 shows a further alternate shape for the insert where aligned threaded openings 27 and 28 are formed in bodies 19 and 20, and insert 23 is cast therein with the shape of a screw.

While FIGS. 1 to 6 show the broadest concept for joining two bodies, it will be apparent that the bodies could have any desired shape. For example, it may be desired to join two hollow tubes in end-to-end relation whereupon the tubes are provided with outwardly extending flanges which are joined to one another around their periphery by two or more joints of the types shown in cross section in any of the FIGS. or by an annular joint extending around the butting flange surfaces.

Figure 8:
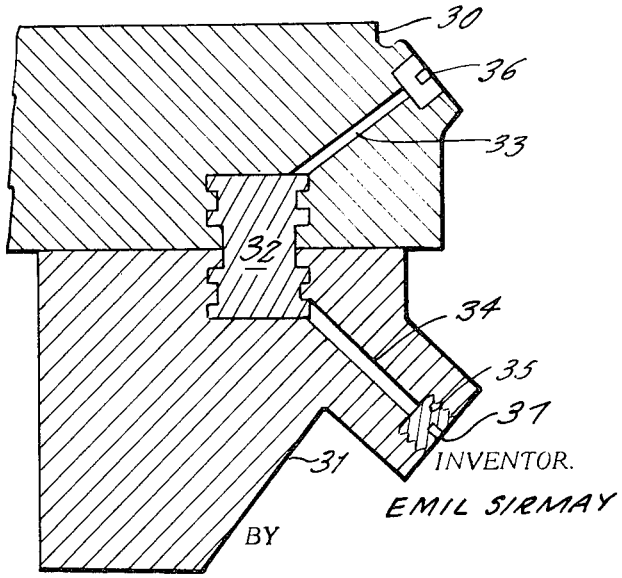
FIG. 8 shows a cross section view of two members to be joined and illustrates a manner in which the joint may be broken.

FIG. 8 shows two bodies 30 and 31 which may be joined and broken repeatedly, as desired. The cavity 32 is one having a refractory lining (e.g., silicon carbide, tungsten carbide, aluminile or molybdenum-oxide), and is connected through the exterior of the bodies 30 and 31 by way of a pair of channels 33, 34. A porous plug 35 connects the channel 34 to the exterior of the body 31.

In forming the joint, the molten metal is poured under pressure through the inlet channel 33 into the cavity 32 which acts as a melting pot, preventing dissipation of heat from the molten metal, and suffices to drive out the air in the cavity through the channel 34 and the plug 35. The plug 35 is then closed to prevent the metal from running out through outlet channel 34, and after sufficient metal is added to the cavity, the inlet channel 33 is also sealed off. A good bond is then established when the metal cools.

To break the bond, the plug 35 is opened and a high electrical current is applied between inserted or cast electrodes 36, 37 of inlet and outlet channels 33, 34, respectively. This current is selected of a value high enough to melt the joined metals, and thus cause the resulting molten metal to flow out the channel 34 and the plug 35. The molten metal can easily be retrieved and used in other bonding operations.

Moreover, while the application describes the use of the novel process specifically for metallic bodies, it will be apparent that one or both of the bodies to be joined can be other than metallic materials and could, for example, be a rigid ceramic or the like.

The invention has particularly useful application, for example, in the joining of a ceramic ring or the like to a metallic body which is normally accomplished only by rather complex ceramic-to-metallic joining methods. In accordance with the invention, however, and, for example in FIG. 3, body 10 can be of steel or bronze or the like, while body 11 can be of a ceramic with the two bodies easily connected together, if desired, and sealed with respect to one another by the cast insert 14. In a similar manner, plastic bodies could be joined to either metallic bodies or ceramic bodies by the cast interlock of the invention.

As will be readily apparent from the above description, the instant invention provides a means for making strong, secure joints between metallic parts, and which can be used as a substitute for welding. When similar metallic parts were joined, the strength of the resultant joint was found to equal the tensile strength of the particular metals employed. When dissimilar metals were joined, the tensile strength of the resultant joint was found to be substantially equal to that of the weaker of the two metals.

Numerous advantages result from joining two parts together by the introduction of a nonferrous bonding agent, in accordance with the present invention. For example, the joint which is formed has been found to be many times stronger than joints effective by any of currently used welding methods. Also, as contradistinct to welding operations, there exists no need with the present invention to first heat the parts to be joined to very high temperatures before welding can be accomplished. Making the joint, in addition, can be accomplished in approximately one-tenth the time and cost associated with these conventional welding methods.

Other features exist to substantiate the potential and practical use of this substitute joining technique for both plant and field applications. In plant applications, the method of the instant invention would change many existing concepts of metal fabrication. In particular, it would eliminate the necessity of casting, forging, machining and installing heavy parts of complex configuration which are very expensive to make, difficult to handle, and usually prone to have serious discontinuities. Any ponderous or difficult assembly, similarly, could be made quite simple by joining various lighter and fully machined sections together at the place of the final installation. This latter feature would also greatly simplify the fitting and alignment of heavy, close tolerance installations.

In field applications, on the other hand, very simple procedures need be employed in order to effect the increasingly strong joint, as compared to the strength of a weld. Namely, holes could be drilled in the field and the bonding alloy could be immediately introduced on the spot. No heat affected zone or change in the crystalline structure of the metal to be bonded would be created. And no stress relieving (or other post repair work) would be necessitated. As will be readily apparent, all equipment necessary for effecting such repair could be easily transported to the spot where the joint is to be made.

In addition to serving as a substitute for welding, the method of the present invention can also prove advantageous in providing superior substitutes for standard metal fasteners. Especially, large sized screw fasteners that require special drilling, tapping and other preparation could be eliminated. Similarly, besides serving to provide a stronger joint, it will be apparent that the joint formed according to the invention comprises a hermetically sealed metallic connection. New and superior methods of fabrication could be developed based upon the method of the invention because the high tensile joining metal employed may be used in any quantity required to form desired configurations. Permanent electrical circuits, for example, could be formed according to the method of the invention, to serve the dual purpose of also holding the parts together. Such possibility offers various improvements in the construction of turbo generators and other large electrical equipment in particular. Also, much more rapid and superior methods of ship building could be developed as the well known problems of locked in stresses—which are now so troublesome in ship building operations—could be completely avoided. Furthermore, it should be noted that the joint made using the teachings of the invention would be completed in a small fraction of the time now spent in a welding operation.

As was previously noted, the joints formed according to the method of the present invention is not limited to a joint for metals alone. By roughening the reentrant openings, the adhesion of a cast slug to the inner walls is quite satisfactory, whether the bodies to be joined are both metallic in nature, or whether one or more is a ceramic. Prior art methods of joining two such diverse elements has always proven to be rather complex, where it is at all possible. According to the method of this invention, on the other hand, such joining is easily obtainable.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. As a substitute for welding, the method of securing together a first and second metallic body along first and second respective adjacent surface portions comprising the steps of forming a first reentrantly shaped opening extending from said first surface portion into said first body, forming a second reentrantly shaped opening extending from said second surface portion into said second body, placing said first and second surface portions of said first and second bodies in contact with one another, aligning said first and second openings with respect to one another, roughening the interior surfaces of said first and second reentrantly shaped openings to a finishing number in the range of 125–1,000 to provide an adhesive force joining a slug subsequently formed therein to said interior surfaces, pouring a molten castable insert material having a melting point above 1,000° F. into the full volume of the cavity formed by said first and second openings to define said slug, and cooling said molten material to solidify said slug which completely fills the volume of said cavity, the mass of said slug being small relative to the masses of said first and second bodies so that the temperature rise of said first and second metallic bodies is relatively small when said castable insert material is poured into said first and second openings.

2. The method of claim 1, wherein said insert material is from the group consisting of bronze, aluminum and steel.

* * * * *

PO-1050
(5/69)

UNITED STATES PATENT OFFICE
CERTIFICATE OF CORRECTION

Patent No. 3,629,933            Dated December 28, 1971

Inventor(s) Emil Sirmay

It is certified that error appears in the above-identified patent and that said Letters Patent are hereby corrected as shown below:

Column 1, immediately after the title, read the following paragraph -- This is a continuation-in-part of application Serial No. 650,514, filed June 30, 1967 and now abandoned. --

Signed and sealed this 24th day of April 1973.

(SEAL)
Attest:

EDWARD M. FLETCHER, JR.
Attesting Officer

ROBERT GOTTSCHALK
Commissioner of Patents